(12) United States Patent
Margolies

(10) Patent No.: US 7,833,586 B2
(45) Date of Patent: Nov. 16, 2010

(54) ALUMINA-BASED PROTECTIVE COATINGS FOR THERMAL BARRIER COATINGS

(75) Inventor: Joshua L. Margolies, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 385 days.

(21) Appl. No.: 11/923,011

(22) Filed: Oct. 24, 2007

(65) Prior Publication Data

US 2009/0110903 A1  Apr. 30, 2009

(51) Int. Cl.
*B32B 15/04* (2006.01)
*B05D 1/02* (2006.01)

(52) U.S. Cl. .................... 427/422; 428/457; 428/304.4; 428/469; 428/472; 428/701; 428/702; 428/697; 427/427; 427/453; 427/454

(58) Field of Classification Search .................. None
See application file for complete search history.

(56) References Cited

U.S. PATENT DOCUMENTS

| | | | |
|---|---|---|---|
| 4,116,723 A | 9/1978 | Gell et al. | |
| 4,741,286 A | 5/1988 | Itoh et al. | |
| 4,999,225 A | 3/1991 | Rotolico et al. | |
| 5,047,612 A | 9/1991 | Savkar et al. | |
| 5,059,095 A | 10/1991 | Kushner et al. | |
| 5,332,598 A | 7/1994 | Kawasaki et al. | |
| 5,399,313 A | 3/1995 | Ross et al. | |
| 5,660,885 A | 8/1997 | Hasz et al. | |
| 6,465,090 B1 | 10/2002 | Stowell et al. | |
| 6,485,792 B1 | 11/2002 | Grylls et al. | |
| 6,627,323 B2 | 9/2003 | Nagaraj et al. | |
| 2004/0115410 A1 | 6/2004 | Nagaraj et al. | |
| 2006/0115659 A1 | 6/2006 | Hazel et al. | |
| 2006/0115661 A1 | 6/2006 | Hazel et al. | |
| 2006/0165893 A1 | 7/2006 | Magaraj et al. | |

FOREIGN PATENT DOCUMENTS

| | | | |
|---|---|---|---|
| EP | 1428908 A1 | 6/2004 | |
| EP | 1428909 A1 | 6/2004 | |
| EP | 1609885 A1 | 12/2005 | |

OTHER PUBLICATIONS

European Search Report mailed Feb. 13, 2009, 7 pages.
L.C. Erickson et al., "Alumina Coating by Plasma Spraying of Monosize Sapphire Particles" vol. 8 (3), Sep. 1999 pp. 421-426, Journal of Thermal Spray Technology.

*Primary Examiner*—Ling Xu
(74) *Attorney, Agent, or Firm*—Cantor Colburn LLP

(57) ABSTRACT

A thermally sprayed alumina-based coating is deposited onto a thermal barrier coating to provide an article such as a turbine engine component with both CMAS mitigation and antifouling. The alumina-based coating increases a melting point of the CMAS to a temperature greater than an operating temperature of the turbine engine component. The surface roughness of the thermally sprayed alumina based coating in less than 4.0 micrometers to 0.75 micrometers. The alumina based coatings include at least 60 weight percent alumina based on a total weight of the alumina-based coating.

15 Claims, 1 Drawing Sheet

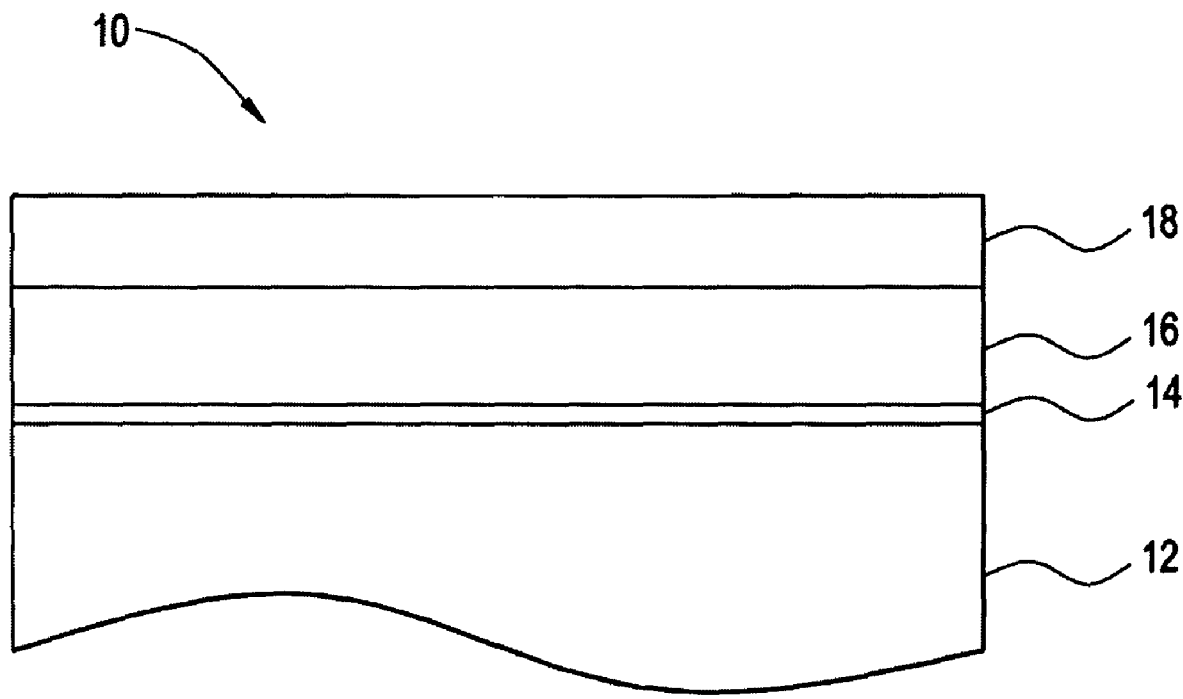
FIGURE

ALUMINA-BASED PROTECTIVE COATINGS FOR THERMAL BARRIER COATINGS

BACKGROUND OF THE INVENTION

The present disclosure generally relates to alumina protective coatings for thermal barrier coatings, and more specifically, thermally sprayed alumina-based protective coatings for thermal barrier coatings utilized in various surfaces on gas turbine components.

In turbine engines, such as but not limited to aircraft and power generation turbines, air is drawn into the front of the engine, compressed by a shaft-mounted compressor, and mixed with fuel. The air-fuel mixture is combusted, and the resulting hot combustion gas is passed through a turbine mounted on the same shaft. The turbine includes a rotor with turbine blades supported on its periphery, and a stationary (that is, not rotating) gas turbine flow path shroud that confines the combustion gas to flow through the annulus between the rotor and the shroud, and thence against the turbine blades. The constrained flow of hot combustion gas turns the turbine by contacting an airfoil portion of the turbine blade, which turns the rotor shaft and provides power to the compressor. The rotating turbine blades and the gas turbine stationary flow path shroud are heated to high temperatures by the hot combustion gas.

To prevent these components from getting too hot, thermal barrier coatings (TBCs) are often coated onto various surfaces of the turbine components to help insulate the components from the high temperatures in the hot gas path. TBCs are an increasingly important element in current and future gas turbine engine designs because of the higher operating temperatures in gas turbine engines. Examples of turbine engine parts and components for which such thermal barrier coatings are desirable include turbine blades and vanes, turbine shrouds, buckets, nozzles, combustion liners and deflectors, and the like. These thermal barrier coatings are deposited onto a metal substrate (or more typically onto a bond coat layer on the metal substrate for better adherence) from which the part or component is formed to reduce heat flow and to limit the operating temperature these parts and components are subjected to. This metal substrate typically comprises a metal alloy such as a nickel-, cobalt-, and/or iron-based alloy (e.g., a high temperature super alloy).

The thermal barrier coating is usually prepared from a ceramic material, such as a chemically (metal oxide) stabilized zirconia. Examples of such chemically stabilized zirconias include yttria-stabilized zirconia, scandia-stabilized zirconia, calcia-stabilized zirconia, magnesia-stabilized zirconia, and combinations thereof. The thermal barrier coating of choice is typically an yttria-stabilized zirconia ceramic coating. A representative yttria-stabilized zirconia thermal barrier coating usually comprises about 7-weight % yttria and about 93-weight % zirconia. The thickness of the thermal barrier coating depends upon the metal part or component it is deposited on, but is usually in the range of from about 3 to about 70 mils thick for high temperature gas turbine engine parts.

Although significant advances have been made in improving the durability of thermal barrier coatings for turbine engine components, such coatings are still susceptible to various types of damage, including objects ingested by the engine, erosion, oxidation, and attack from environmental contaminants. In addition, in trying to achieve reduced thermal conductivity, other properties of the thermal barrier coating can be adversely impacted. For example, the composition and crystalline microstructure of a thermal barrier coating, such as those prepared from yttria-stabilized zirconia, can be modified to impart to the coating an improved reduction in thermal conductivity, especially as the coating ages over time. However, such modifications can also unintentionally interfere with desired spallation resistance, especially at the higher temperatures that most turbine components are subjected to. As a result, the thermal barrier coating can become more susceptible to damage due to the impact of, for example, objects and debris ingested by the engine and passing through the turbine sections thereof. Such impact damage can eventually cause spallation and loss of the thermal barrier coating.

In addition, at the higher temperatures of engine operation, the environmental contaminants can adhere to the heated or hot thermal barrier coating and subsequently cause damage. For example, environmental contaminants can form compositions that are liquid or molten at the higher temperatures at which gas turbine engines operate. These molten contaminant compositions can dissolve the thermal barrier coating, or can infiltrate its porous structure, i.e., can infiltrate the pores, channels, or other cavities in the coating. Upon cooling, the infiltrated contaminants solidify and reduce the coating strain tolerance, thus initiating and propagating cracks that cause delamination, spalling and loss of the thermal barrier coating material either in whole or in part. Damage may also result from the freezing contaminants having a different coefficient of thermal expansion relative to the TBC.

These pores, channels or other cavities that are infiltrated by such molten environmental contaminants can be created by environmental damage, or even the normal wear and tear that results during the operation of the engine. However, the porous structure of pores, channels or other cavities in the thermal barrier coating surface more typically is the result of the processes by which the thermal barrier coating is deposited onto the underlying bond coat layer-metal substrate. For example, thermal barrier coatings that are deposited by air plasma spray techniques tend to create a sponge-like porous structure of open pores in at least the surface of the coating. By contrast, thermal barrier coatings that are deposited by physical (e.g., chemical) vapor deposition techniques tend to create a porous structure comprising a series of columnar grooves, crevices or channels in at least the surface of the coating. This porous structure can be important in the ability of these thermal barrier coatings to tolerate strains occurring during thermal cycling and to reduce stresses due to the differences between the coefficient of thermal expansion (CTE) of the coating and the CTE of the underlying bond coat layer/substrate.

For turbine engine parts and components having thermal barrier coatings with such porous surface structures; environmental contaminant compositions of particular concern are those containing oxides of calcium, magnesium, aluminum, silicon, and mixtures thereof. These oxides combine to form contaminant compositions comprising mixed calcium-magnesium-aluminum-silicon-oxides (Ca—Mg—Al—SiO), hereafter referred to as "CMAS." During normal engine operations, CMAS can become deposited on the TBC surface, and can become liquid or molten at the higher temperatures of normal engine operation. Damage to the TBC typically occurs when the molten CMAS infiltrates the porous surface structure of the thermal barrier coating. After infiltration and upon cooling, the molten CMAS solidifies within the porous structure. This solidified CMAS causes stresses to build within the thermal barrier coating, leading to partial or complete delamination and spalling of the coating material and, thus partial or complete loss of the thermal protection provided to the underlying metal substrate of the part or component.

CMAS mitigation coatings are often needed for gas turbine operation above 2200° F. Many turbine engines are operating in this temperature regime. Without CMAS mitigation, the TBC is often compromised and the component could fail before it next service interval.

Alumina is known to protect TBCs from CMAS infiltration. It has also demonstrated ability to yield smooth anti-fouling surfaces for hot gas path components. Current processes for depositing alumina include chemical vapor deposition (CVD) for CMAS protection and the application of alcohol slurry solutions for anti-fouling applications. However, CVD processes are prohibitively expensive and slow. The CVD process does not lend its self to the large scale of gas turbine components since it requires controlled atmospheric conditions. With regard to the use of alcohol based slurry solutions, these solutions generally provide a limited shelf life, high cost and are typically incorporate hazardous organic solvents. The slurry coating process also requires a post coating drying and furnace curing. The slurry coatings are not practical for CMAS mitigation because the thicknesses of the coatings are limited. Moreover, with regard to anti-fouling applications, the cohesive strength of the slurry coating is limited because it cannot be sintered without melting the metallic component to which it is applied. Another limitation of the current slurry process is that it is limited to service temperatures of 2000° F. making it incompatible with the CMAS environment. Moreover, current slurry methods also generally require a 12 hour dry followed by 8 hour high temperature cure, making manufacturing costs high.

Accordingly, it would be desirable to provide improved methods for protecting the thermal barrier coating to the adverse effects of such environmental contaminants. In particular, a need exists to protect such thermal barrier coatings that can be suitably used to mitigate both CMAS and fouling of hot path gas surfaces.

BRIEF DESCRIPTION OF THE INVENTION

Disclosed herein are processes and coating systems for mitigating CMAS and providing anti-fouling protection to a thermal barrier coating disposed on metallic components. In one embodiment, a process for depositing an alumina-based coating onto a thermal barrier coating comprises providing an article with a thermal barrier coating disposed thereon; heating an alumina powder, wherein the alumina powder has a composition of at least 60 weight percent alumina with a balance comprising titania, zirconia, and gadolinia; and thermally spraying the alumina powder onto the thermal barrier coating to form the alumina-based coating, wherein the alumina-based coating increases a melting point of a contaminant composition comprising mixed calcium-magnesium-aluminum-silicon-oxides relative to the contaminant composition in the absence of the alumina-based coating.

A coating system comprises a thermal barrier coating comprising a chemically stabilized zirconia material disposed on a metallic component; and a thermally sprayed alumina-based coating disposed on the thermal barrier coating, wherein the alumina-based coating comprises at least 60 weight percent alumina based on a total weight of the alumina-based coating, the alumina-based coating having a thickness effective to elevate a melting point of a contaminant composition comprising mixed calcium-magnesium-aluminum-silicon-oxide systems, and wherein the thermally sprayed alumina-based coating has an average surface roughness of less than 4.0 micrometers to 0.75 micrometers.

The above described and other features are exemplified by the following figures and detailed description.

BRIEF DESCRIPTION OF THE DRAWINGS

The FIGURE is a sectional view of an article including a thermal barrier coating and a thermally sprayed alumina outer layer disposed thereon.

DETAILED DESCRIPTION OF THE INVENTION

Disclosed herein are methods for mitigating CMAS and providing anti-fouling protection to a thermal barrier coating (TBC) disposed on metallic components, e.g., gas turbine components. The process generally includes thermally spraying an alumina-based layer of onto the TBC. As used herein, the terms "alumina" and "aluminum oxide" refer interchangeably to those compounds and compositions comprising $Al_2O_3$, including, but not limited to, the unhydrated and hydrated forms. As will be described herein, the proposed coating could protect the TBC at temperatures up to about 3000° F. Moreover, in contrast to the prior methods, the application method can be completed within in minutes, without the need for drying or curing.

In one embodiment, a thermally sprayed alumina-based coating is applied to the TBC, which chemically elevates the CMAS melting point. Advantageously, the resulting thermally sprayed coating is substantially smooth so as to reduce fouling. The method for depositing the alumina-based coating generally includes heating an alumina-based powder, wherein the powder has a composition of at least 60 weight percent alumina, and thermally spraying the powder from a heat source at a powder velocity effective to deposit an alumina-based coating onto the TBC. In other embodiments, the alumina-based powder has a composition of at least 87 weight percent alumina. The thermally sprayed alumina-based coating has an as-deposited average surface roughness of less than 4.0 micrometers to 0.75 micrometers. Because of this, the alumina-based coating can be applied to TBC surfaces that are prone to CMAS as well as surfaces prone to fouling. As previously described, a smooth coating aids in to reducing fouling of surfaces in hot path gas components. It should be noted that surface roughness less than 0.75 microns can be achieved using additional mechanical finishing operations.

By thermally spraying the alumina-based coating, the surface connected porosity of the TBC is decreased. In one embodiment, the alumina-based coating has an average density of less than 8 percent porosity. In another embodiment, the average density is less than 6% porosity, and in still other embodiments, the average density is less than 4% porosity. The average density is generally less than 8% porosity, though it is anticipated that large vertical cracks as designed in some TBC's would be reflected in the alumina-based coating. First, those cracks would fill to some degree, then the alumina-based coating would build up, producing a local valley in the alumina-based layer. It is not required that the alumina-based coating provide a hermetic seal, so absolute porosity is not needed although it may be desired in some applications.

The various embodiments of the thermal barrier coatings are further illustrated by reference to the drawings as described hereafter. Referring now to the drawings, the FIGURE shows a side sectional view of an embodiment of the thermally barrier coating used with a metal substrate of an article indicated generally as 10. The article 10 has a metal substrate indicated generally as 12. Substrate 12 can comprise any of a variety of metals, or more typically metal alloys, that are usually protected by thermal barrier coatings, including those based on nickel, cobalt and/or iron alloys. For example, substrate 12 can comprise a high temperature, heat-resistant alloy, e.g., a superalloy. Such high temperature alloys are disclosed in various references, such as U.S. Pat. No. 5,399, 313 (Ross et al), issued Mar. 21, 1995 and U.S. Pat. No. 4,116,723 (Gell et al), issued Sep. 26, 1978. High temperature alloys are also generally described in Kirk-Othmer's Encyclopedia of Chemical Technology, 3rd Ed., Vol. 12, pp. 417-479 (1980), and Vol. 15, pp. 787-800 (1981). Illustrative high temperature nickel-based alloys are designated by the trade names Inconel®, Nimonic®, Rene® (e.g., Rene® 80-, Rene® 95 alloys), and Udimet®. As described above, the type of substrate 12 can vary widely, but it is representatively in the form of a turbine part or component, such as but not limited to an airfoil (e.g., blade) or turbine shroud.

As shown in the FIGURE, article 10 also includes an optional bond coat layer indicated generally as 14 that is adjacent to and overlies substrate 12. Bond coat layer 14 is typically formed from a metallic oxidation-resistant material that protects the underlying substrate 12 and enables the thermal barrier coating indicated generally as 16 to more tenaciously adhere to substrate 12. Suitable materials for bond coat layer 14 include MCrAlY alloy powders, where M represents a metal such as iron, nickel, platinum or cobalt, in particular, various metal aluminides such as nickel aluminide and platinum aluminide. This bond coat layer 14 can be applied, deposited or otherwise formed on substrate 12 by any of a variety of conventional techniques, such as physical vapor deposition (PVD), including electron beam physical vapor deposition (EBPVD), plasma spray, including air plasma spray (APS) and vacuum plasma spray (VPS), or other thermal spray deposition methods such as high velocity oxy-fuel (HVOF) spray, detonation, or wire spray, chemical vapor deposition (CVD), or combinations of such techniques, such as, for example, a combination of plasma spray and CVD techniques. Typically, a plasma spray technique, such as that used for the thermal barrier coating 16, can be employed to deposit bond coat layer 14. Usually, the deposited bond coat layer 14 has a thickness in the range of from about 1 to about 19.5 mils (from about 25 to about 495 microns). For bond coat layers 14 deposited by PVD techniques such as electron beam plasma vapor deposition (EBPVD), the thickness is more typically in the range of from about 1 about 3 mils (from about 25 to about 76 microns). For bond coat layers deposited by plasma spray techniques such as APS, the thickness is more typically, in the range of from about 3 to about 15 mils (from about 76 to about 381 microns).

The TBC 16 is adjacent to and overlies bond coat layer 14. The thickness of TBC 16 is typically in the range of from about 1 to about 100 mils (from about 25 to about 2540 microns) and will depend upon a variety of factors, including the article 10 that is involved. For example, for turbine shrouds, TBC 16 is typically thicker and is usually in the range of from about 30 to about 70 mils, more typically from about 40 to about 60 mils. By contrast, in the case of turbine blades, TBC 16 is typically thinner and is usually in the range of from about 1 to about 30 mils, more typically from about 3 to about 20 mils.

TBC 16 further comprises an outer layer indicated generally as 18 that is adjacent to and overlies the TBC. Outer layer 18, comprises a thermally sprayed alumina-based coating of at least about 60% alumina and in an amount sufficient to protect TBC 16 at least partially against environmental contaminants that become deposited on the exposed surface. In other embodiments, the alumina-based coating alumina-based coating contains at least about 87% weight percent alumina.

The alumina present in outer layer 18 of TBC 16 provides protection or mitigation against the adverse effects of CMAS that become deposited onto exposed surfaces of the articles 10. The alumina-based coating 18 raises the melting point of CMAS contaminants so that the oxide deposits do not become molten, or alternatively increases the viscosity of such molten deposits so that they do not flow readily, at higher temperatures, e.g., temperatures greater than 2000° F. during operation of the turbine. As a result, these CMAS deposits are unable to further infiltrate or dissolve the normally porous structure of TBC 16.

The thickness of outer alumina-based layer 18 is not intended to be limited and will generally depend upon a variety of factors, including the overall desired thickness of TBC 16 and the particular article 10. Typically, outer layer 18 will be from 0.5 mils to 4 mils. As the thermal barrier effectiveness of alumina-based layer is far less than that of the TBC, the thickness of the outer layer, 18, is desirably low to permit maximum TBC effectiveness.

The composition and thickness of the bond coat layer 14 and outer layer 18 of TBC 16, are typically adjusted to provide appropriate CTEs to minimize thermal stresses between the various layers and the substrate 12 so that the various layers are less prone to separate from substrate 12 or each other. In general, the CTEs of the respective layers typically increase in the direction of outer layer 18 to bond coat layer 14.

Various types of thermal spray techniques well known to those skilled in the art can be utilized to apply or deposit the thermal barrier coating materials in forming the TBCs of the present invention. See, for example, Kirk-Othmer Encyclopedia of Chemical Technology, 3rd Ed., Vol. 15, page 255, and references noted therein, as well as U.S. Pat. No. 5,332, 598 (Kawasaki et al), issued Jul. 26, 1994; U.S. Pat. No. 5,047,612 (Savkar et al) issued Sep. 10, 1991; and U.S. Pat. No. 4,741,286 (Itoh et al), issued May 3, 1998, which are instructive in regard to various aspects of plasma spraying suitable for use herein. In general, typical plasma spray techniques involve the formation of high-temperature plasma, which produces a thermal plume. The thermal barrier coating materials, e.g., alumina-based powders, are fed into the plume, and the high-velocity plume is directed toward the surface of the TBC 16. Various details of such plasma spray coating techniques will be well-known to those skilled in art, including various relevant steps and process parameters such as plasma spray parameters such as spray distances (gun-to-substrate), selection of the number of spray-passes, powder feed rates, particle velocity, torch power, plasma gas selection, oxidation control to adjust oxide stoichiometry, angle-of-deposition, post-treatment of the applied coating; and the like. Torch power can vary in the range of about 10 kilowatts to about 200 kilowatts, and in preferred embodiments, ranges from about 40 kilowatts to about 60 kilowatts. The velocity of the alumina-based coating material particles flowing into the plasma plume (or plasma "jet") is another parameter that is usually controlled very closely.

Briefly, a typical plasma spray system includes a plasma gun anode which has a nozzle pointed in the direction of the deposit-surface of the substrate being coated. The plasma gun is often controlled automatically, e.g., by a robotic mechanism, which is capable of moving the gun in various patterns across the substrate surface. The plasma plume extends in an axial direction between the exit of the plasma gun anode and the substrate surface. Some sort of powder injection means is disposed at a predetermined, desired axial location between the anode and the substrate surface. In some embodiments of such systems, the powder injection means is spaced apart in a radial sense from the plasma plume region, and an injector tube for the powder material is situated in a position so that it can direct the powder into the plasma plume at a desired angle. The powder particles, entrained in a carrier gas, are propelled through the injector and into the plasma plume. The particles are then heated in the plasma and propelled toward the substrate. The particles melt, impact on the substrate, and quickly cool to form the thermal barrier coating.

A suitable thermal spray method for depositing a single thin, dense and smooth alumina-based coating onto the TBC is by high velocity oxy flame (HVOF) or high velocity air plasma spray (HV-APS). An aspect of this embodiment is that the single coating provides the TBC with both CMAS mitigation and anti-fouling. CMAS mitigation coatings on turbine components are desired for gas turbine operation above 2200 degrees Fahrenheit (1204 degrees Celsius). Without the CMAS mitigation coating, the TBC can become compromised and the component could fail before the component's next scheduled servicing. Anti-fouling coatings are required to ensure continued performance per design. When turbines experience fouling of hot gas path components, the aerodynamic properties alter, thus reducing efficiency and output. The low surface roughness of the coating reduces fouling, the build up of contaminants on the surface, including CMAS.

By way of example, HVOF can be used deposit the alumina-based coating onto the TBC. The heat source is respectively a flame and a thermal plume controlled by the input gases, fuels, and nozzle designs. Oxygen, and fuel are supplied at high pressure such that the flame issues from a nozzle at supersonic velocity. A specific gun having a convergent/divergent nozzle can be used to apply an alumina-based coating, e.g., a METCO DJ2600. However, straight bore HVOF guns, such as TopGun and JetKote can also be used. A person with skill in the art would know how to adjust these process parameters. An advantageous aspect of this embodiment is the coating can be deposited under ambient conditions and does not require a vacuum or an explosion-proof environment. Moreover, no curing or additional process steps are needed.

For CMAS mitigation, the alumina-based coating, deposited on the outer surface of a thermal barrier coating, acts sacrificially by reacting with the CMAS contaminant composition at the surface temperature of the thermal barrier coating. While not wanting to be bound by theory, the reaction may be a chemical reaction in which the sacrificial coating is consumed, at least partially, and elevates the melting temperature or viscosity of the contaminant composition. The melting temperature of the CMAS contaminant composition can be specifically increased at least to the surface temperature of the TBC in the reaction zone between the CMAS, and the sacrificial alumina-based coating. This rise in melting point will make the CMAS material sufficiently viscous that infiltration into or reaction with the thermal barrier coating is unlikely or limited to the immediate surface avoiding cracking and/or spallation of the TBC and loss of the thermal protection the TBC provides to the underlying workpiece. The sacrificial alumina-based coatings are specifically applied to a thermal barrier coating in an amount sufficient to effectively elevate the melting temperature or viscosity of substantially all of the liquid contaminant formed. A submicrometer thickness of alumina-based coating on the surface of the thermal barrier coating may help prevent infiltration of molten contaminant compositions into the thermal barrier coating. Enough sacrificial material will be available to be capable of increasing the melting temperature.

For anti-fouling, this embodiment can reduce fouling without post coating operations. Since fouling tends to occur faster on a rough surface, the smooth surface created by the high velocity thermal spray will reduce fouling. The surface is smooth with an average surface roughness less than about 4 micrometers to about 0.75 micrometers, thereby eliminating the need for refinishing and smoothing operations for most applications. In addition, the adhesion of the coating onto the TBC is strong enough that neither furnace curing nor another adhesion-improving treatment is needed. While some post-coating operations are not needed, post-coating operations are not to be excluded from the methods in this application.

Another aspect of the embodiment is that the substrate has no size limitation or area limitation and it works well for large-scale parts. Using thermal spray techniques such as HVOF or HV-APS permits selective application of coating to desired thickness with no post coating operations required. It can be selectively applied without the need of masking. The coating is not limited to thickness and can thus provide a longer period of protection.

An additional advantage is that it does not use volatile or explosive organic solvents, which have a limited shelf life, can increase costs, and require more complex manufacturing. In addition, there are no post-coating operations like drying or furnace curing necessary.

Yet another aspect of the embodiment is cost reduction. The single coating process is faster and cheaper than other methods. In addition, a lack of masking and organic solvents further reduces costs. No vacuum or explosion proof environments are required.

Unless defined otherwise, technical and scientific terms used herein have the same meaning as is commonly understood by one of skill in the art to which this invention belongs. The terms "a" and "an" do not denote a limitation of quantity, but rather denote the presence of the referenced item. The modifier "about" used in connection with a quantity is inclusive of the stated value and has the meaning dictated by the context (e.g., includes the degree of error associated with measurement of the particular quantity). All amounts, parts, ratios and percentages used herein are by weight unless otherwise specified.

Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A process for depositing an alumina-based coating onto a thermal barrier coating, the process comprising
providing an article with a thermal barrier coating disposed thereon;
heating an alumina powder, wherein the alumina powder has a composition of at least 60 weight percent alumina with a balance comprising titania, zirconia, and gadolinia based on a total weight of the alumina-based coating; and thermally spraying the alumina powder onto the thermal barrier coating to form the alumina-based coating, wherein the alumina-based coating increases a melting point of a contaminant composition comprising mixed calcium-magnesium-aluminum-silicon-oxides relative to the contaminant composition in the absence of the alumina-based coating, and the alumina-based coating has an average surface roughness of less than 4.0 micrometers to 0.75 micrometers.

2. The process of claim 1, wherein thermally spraying the alumina powder comprises a high velocity oxygen fuel flame process.

3. The process of claim 1, wherein thermally spraying the alumina powder comprises high velocity air plasma spray process.

4. The process of claim 1, wherein the thermal barrier coating comprises a chemically stabilized zirconia material.

5. The process of claim 1, wherein the article comprises a nickel-based alloy a cobalt-based alloy, an iron-based alloy, and combinations thereof.

6. The process of claim 1, wherein the thermal barrier coating is porous.

7. The process of claim 1, wherein the alumina powder has a composition of at least 87 weight percent alumina based on the total weight of the alumina-based coating.

8. A turbine component having a coating applied by the coating method of claim 1.

9. A coating system, comprising:
a thermal barrier coating comprising a chemically stabilized zirconia material disposed on a metallic component; and
a thermally sprayed alumina-based coating disposed on the thermal barrier coating, wherein the alumina-based coating comprises at least 87 weight percent alumina based on a total weight of the alumina-based coating, the alumina-based coating having a thickness effective to elevate a melting point of a contaminant composition comprising mixed calcium-magnesium-aluminum-silicon-oxide systems, and wherein the thermally sprayed alumina-based coating has an average surface roughness of less than 4.0 micrometers to 0.75 micrometers.

10. The coating system of claim 9, wherein the thermally sprayed coating is deposited by a high velocity oxygen fuel process.

11. The coating system of claim 9, wherein the thermally sprayed coating is deposited by a high velocity air plasma spray process.

12. The coating system of claim 9, wherein the thermal barrier coating is porous.

13. The coating system of claim 9, wherein the metallic component is a hot path gas component.

14. The coating system of claim 9, wherein the chemically stabilized zirconia comprises an yttria-stabilized zirconia, scandia-stabilized zirconia, calcia-stabilized zirconia, magnesia-stabilized zirconia, and combinations thereof.

15. The coating system of claim 9, wherein the metallic component comprises a nickel-based alloy a cobalt-based alloy, an iron-based alloy, and combinations thereof.

* * * * *